United States Patent
Oh et al.

(10) Patent No.: US 12,374,491 B2
(45) Date of Patent: Jul. 29, 2025

(54) DIELECTRIC CERAMIC COMPOSITION FOR MULTI-LAYER CERAMIC CAPACITOR FOR USE IN EXTREME ENVIRONMENTS

(71) Applicant: SAMHWA CAPACITOR CO., LTD., Yongin-si (KR)

(72) Inventors: Young Joo Oh, Yongin-si (KR); Jung Rag Yoon, Yongin-si (KR); Chang Ho Lee, Yongin-si (KR)

(73) Assignee: SAMHWA CAPACITOR CO., LTD., Yongin-si (KR)

( * ) Notice: Subject to any disclaimer, the term of this patent is extended or adjusted under 35 U.S.C. 154(b) by 532 days.

(21) Appl. No.: 17/972,760

(22) Filed: Oct. 25, 2022

(65) Prior Publication Data

US 2024/0071686 A1    Feb. 29, 2024

(30) Foreign Application Priority Data

Aug. 29, 2022    (KR) .................. 10-2022-0108298

(51) Int. Cl.
*C04B 35/468*    (2006.01)
*H01G 4/12*    (2006.01)

(52) U.S. Cl.
CPC ......... *H01G 4/1227* (2013.01); *C04B 35/468* (2013.01); *C04B 2235/3236* (2013.01); *C04B 2235/3239* (2013.01); *C04B 2235/3251* (2013.01); *C04B 2235/3277* (2013.01); *C04B 2235/6567* (2013.01)

(58) Field of Classification Search
CPC .................. C04B 35/468; C04B 35/4682
See application file for complete search history.

(56) References Cited

U.S. PATENT DOCUMENTS 6,403,513 B1    6/2002   Sato et al.

FOREIGN PATENT DOCUMENTS

| CN | 111499383 A | * | 8/2020 | |
| CN | 112723876 A | * | 4/2021 | ........... C04B 35/468 |
| KR | 100822178 | | 4/2008 | |

\* cited by examiner

*Primary Examiner* — Christopher A Fiorilla
(74) *Attorney, Agent, or Firm* — CANTOR COLBURN LLP

(57) ABSTRACT

A dielectric ceramic composition for multi-layer ceramic capacitor for use in extreme environments is formed by mixing a main compos it ion and a composite oxide for low-temperature sintering, where the main composition includes 96.0 to 99.0 wt. % of $BaTiO_3$ and 1.0 to 4.0 wt. % of $Nb_2O_5$ and $Co_3O_4$ as an additive. The main composition is formed by per forming a heat treatment for synthesis to form a core-shell structure having the $BaTiO_3$ as a core and the $Nb_2O_5$ and $Co_3O_4$ covering the sur face of the $BaTiO_3$. The composite oxide for low-temperature sintering is at least one selected from $BaV_2O_6$, $Ba_3V_4O_{13}$ and $Ba_4V_2O_9$.

7 Claims, 1 Drawing Sheet

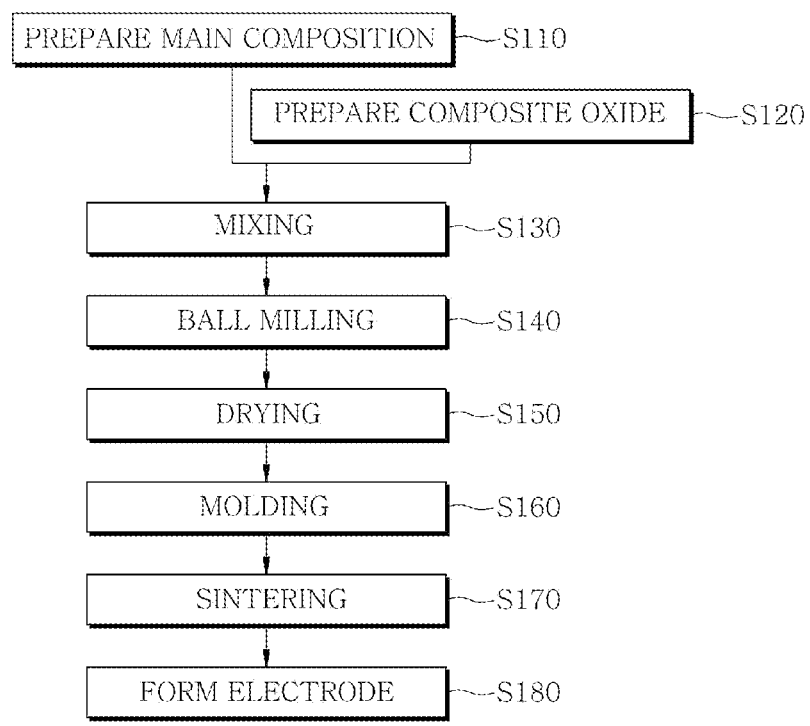

DIELECTRIC CERAMIC COMPOSITION FOR MULTI-LAYER CERAMIC CAPACITOR FOR USE IN EXTREME ENVIRONMENTS

BACKGROUND OF THE INVENTION

1. Technical Field

The present invention relates to a dielectric ceramic composition for multi-layer ceramic capacitor for use in extreme environments, and more particularly, to a dielectric ceramic composition for multi-layer ceramic capacitor for use in extreme environments, which dielectric ceramic composition is formed by using a $BaTiO_3$—$Nb_2O_5$—$Co_3O_4$ system being easily formed into a core-shell structure and $BaO$—$V_2O_5$ as a composite oxide for low-temperature sintering excellent in high-frequency dielectric properties and capable of being sintered at low temperatures, to meet the X7R characteristics specified in the Electric Industries Association (EIA) standard, thereby providing a long lifespan and a high reliability when in use for extreme environments, such as military (standard, MIL-PRF123) or aerospace (standard, ESCC 3009) use.

2. Description of the Related Art

In general, multi-layer ceramic capacitors (MLCCs) applied for information technology (IT) and household uses are comprised of $BaTiO_3$ as a main component for a dielectric ceramic composition and Ni as a metal for internal electrode, where Ni is a metal with an advantage in terms of high capacity and economic feasibility. The technology related to a dielectric ceramic composition using $BaTiO_3$ as a main component for a dielectric ceramic composition is disclosed in Korean Patent Registration No. 10-0822178 (Patent Document 1).

Patent Document 1 relates to a dielectric ceramic, which has a composition including a main component and an additive component. The main component is represented by the general formula $ABO_3$, where A is at least one including Ba as selected from Ba and Ca; and B is at least one including Ti as selected from Ti, Zr and Hf, and the additive component includes a rare earth element and Cu. The dielectric ceramic has a structure composed of crystal grains using $ABO_3$ as a main component and grain boundaries as regions between adjacent crystal grains.

According to the cross section of the dielectric ceramic of Patent Document 1 obtained by field emission—transmission electron microscope—energy dispersive X-ray spectroscopy (FE-TEM-EDX) with a probe diameter of 1 nm and an acceleration voltage of 200 kV, it satisfies the requirement for dielectric ceramic that the region where rare earth elements exist occupies more than 90% in 55 to 85% of the crystal grains and less than 10% in 15 to 45% of the crystal grains. Further, the molar ratio of the average concentration of rare earth elements in the grain boundaries to the average concentration of rare earth elements in the crystal grains is less than 2.

As disclosed in Patent Document 1, multi-layer ceramic capacitors use a dielectric composition, which is suitable for reduction firing in the case of using Ni or Cu for internal electrodes and meets the X5R (−55° C.~85° C., ±15%) characteristics specified in the EIA standard. The multi-layer ceramic capacitors using such a dielectric composition are available for household or industrial uses. There are also many disclosed techniques related to the dielectric composition for multi-layer ceramic capacitors for household or industrial use that meets the X7R (−55° C.~125° C., ±15%) characteristics as well as the aforementioned X5R (−55° C.~85° C., ±15%) characteristics under conditions that Ni or Cu is used for internal electrodes.

The multi-layer ceramic capacitors for use in aerospace or extreme environments use precious metals such as Ag—Pd or Pt for internal electrodes. The dielectric composition for the multi-layer ceramic capacitor using precious metals such as Ag—Pd and Pt for internal electrodes needs to be sintered at low temperatures. In the prior art, such additives for low-temperature sintering as $V_2O_5$, $SiO_2$, $B_2O_3$, CuO, and $Li_2CO_3$, or glass frits are used for low-temperature sintering of the dielectric composition.

Using $V_2O_5$, $SiO_2$, $B_2O_3$, CuO, or $Li_2CO_3$ alone as an additive for low-temperature sintering may narrow the optimum sintering temperature range during sintering, causing a problem that the dielectric composition has a great change in the dielectric or electrical properties according to the sintering temperature in the fabrication process. The addition of glass frits may enable the dielectric composition to be sintered at low temperatures, but it also deteriorates the dielectric loss characteristics of the dielectric composition or increases the viscosity of the slurry prepared from the dielectric composition for fabrication of multi-layer ceramic capacitors, resulting in gelation of the slurry and difficulties in the fabrication process.

PRIOR DOCUMENTS

Patent Documents (Patent Document 1): Korean Patent Registration No. 10-0822178

SUMMARY OF THE INVENTION

For solving the aforementioned problems, it is an object of the present invention to provide a dielectric ceramic composition for multi-layer ceramic capacitor for use in extreme environments, which dielectric ceramic composition is formed by using a $BaTiO_3$—$Nb_2O_5$—$Co_3O_4$ system being easily formed into a core-shell structure and $BaO$—$V_2O_5$ as a composite oxide for low-temperature sintering excellent in high-frequency dielectric properties and capable of being sintered at low temperatures, to meet the X7R characteristics specified in the Electric Industries Association (EIA) standard, thereby providing a long lifespan and a high reliability when in use for extreme environments, such as military (standard, MIL-PRF123) or aerospace (standard, ESCC 3009) use.

It is another object of the present invention to provide a dielectric ceramic composition for multi-layer ceramic capacitor for use in extreme environments, which dielectric ceramic composition is formed by using a $BaTiO_3$—$Nb_2O_5$—$Co_3O_4$ system being formed into a core-shell structure and $BaO$—$V_2O_5$ as a composite oxide for low-temperature sintering excellent in high-frequency dielectric properties and capable of being sintered at low temperatures, thereby being sintered at various temperatures for activation and preventing dielectric loss and gelation of slurries.

The dielectric ceramic composition for multi-layer ceramic capacitor for use in extreme environments according to the present invention is formed by mixing a main composition and a composite oxide for low-temperature sintering, where the main composition is formed by mixing 96.0 to 99.0 wt. % of $BaTiO_3$ and 1.0 to 4.0 wt. % of $Nb_2O_5$ and $Co_3O_4$ as an additive and then performing a heat treatment for synthesis to form a core-shell structure having the $BaTiO_3$ as a core and the $Nb_2O_5$ and $Co_3O_4$ covering the surface of the $BaTiO_3$. The composite oxide for low-temperature sintering is at least one selected from $BaV_2O_6$, $Ba_3V_4O_{13}$ and $Ba_4V_2O_9$.

BRIEF DESCRIPTION OF DRAWINGS

The above and/or other aspects of the present invention will become apparent and more readily appreciated from the following description of the exemplary embodiments, taken in conjunction with the accompanying drawings in which:

FIG. 1 is a flowchart showing a method for fabricating an experimental example using a dielectric ceramic composition for multi-layer ceramic capacitors for use in extreme environments.

DETAILED DESCRIPTION

Hereinafter, a description will be given as to embodiments of a dielectric ceramic composition for multi-layer ceramic capacitors for use in extreme environments according to the present invention.

The dielectric ceramic composition of the present invention is the mixture of a main composition and a composite oxide for low-temperature sintering. The main composition is prepared by mixing 96.0 to 99.0 wt. % of $BaTiO_3$ and 1.0 to 4.0 wt. % of $Nb_2O_5$ and $Co_3O_4$ as an additive and then performing a heat treatment for synthesis to form a core-shell structure comprised of the $BaTiO_3$ as a core and the $Nb_2O_5$ and $Co_3O_4$ covering the surface of $BaTiO_3$. The composite oxide for low-temperature sintering is at least one selected from $BaV_2O_6$, $Ba_3V_4O_{13}$ and $Ba_4V_2O_9$.

A specific embodiment of the main composition is prepared by mixing 96.0 to 99.0 wt. % of $BaTiO_3$, 0.75 to 3.0 wt. % of $Nb_2O_5$ and 0.25 to 1.0 wt. % of $Co_3O_4$ and conducting a heat treatment for synthesis at 1,000 to 1,200° C. for 2 to 3 hours to form a core-shell structure comprised of the $BaTiO_3$ as a core and the $Nb_2O$ and $Co_3O_4$ covering the surface of $BaTiO_3$, where the mixing weight ratio of $Nb_2O_5$ to $Co_3O_4$ is 3:1.

$Nb_2O$ and $Co_3O_4$, used as additives, are mixed at a mixing weight ratio (wt. %) of 3:1. For example, the main composition is formed by mixing 96.0 to 99.0 wt. % of $BaTiO_3$, 0.75 to 3.0 wt. % of $Nb_2O_5$ and 0.25 to 1.0 wt. % of $Co_3O_4$, where the mixing weight ratio (wt. %) of $Nb_2O_5$ to $Co_3O_4$ is 3:1.

In an embodiment of the composite oxide for low-temperature sintering that includes one of $BaV_2$%, $Ba_3V_4O_{13}$ and $Ba_4V_2O_9$, either $BaV_2O_6$ or $Ba_3V_4O_{13}$ is used in an amount of 1 to 3.0 parts by weight with respect to 100 parts by weight of the main composition.

In another embodiment of the composite oxide for low-temperature sintering that includes two of $BaV_2O_6$, $Ba_3V_4O_{13}$ and $Ba_4V_2O_9$, $BaV_2O_6$ and $Ba_3V_4O_{13}$ are used, where $BaV_2$% is mixed in an amount of 0.5 to 1.0 part by weight with respect to 100 parts by weight of the main composition and $Ba_3V_4O_{13}$ is mixed in an amount of 0.5 to 2.0 parts by weight with respect to 100 parts by weight of the main composition.

In further another embodiment of the composite oxide for low-temperature sintering that includes all the three of $BaV_2O_6$, $Ba_3V_4O_{13}$ and $Ba_4V_2O_9$, $BaV_2O_9$ is used in an amount of 0.5 to 2.0 parts by weight with respect to 100 parts by weight of the main composition, $Ba_3V_4O_{13}$ is used in an amount of 0.5 to 2.0 parts by weight with respect to 100 parts by weight of the ma in composition, and $Ba_4V_2O_9$ is used in an amount of 0.3 to 0.7 part by weight with respect to 100 parts by weight of the main composition.

Each of $BaV_2O_6$, $Ba_3V_4O_{13}$ and $Ba_4V_2O_9$ used as the composite oxide for low-temperature sintering is formed by mixing BaO and $V_2$%, where the molar ratio of BaO to $V_2O_6$ is 1:1 in $BaV_2$%, 3:2 in $Ba_3V_4O_{13}$ and 4:1 in $Ba_4V_2O_9$. Among the $BaV_2$%, $Ba_3V_4O_{13}$ and $Ba_4V_2O_9$ used as the composite oxide for low-temperature sintering, $Ba_4V_2O_9$ is used only when all the three are mixed, and not used when one or two of the three are mixed.

The aforementioned dielectric ceramic composition meets the requirement to have a permittivity ($\varepsilon$) of 2000 to 2500, a loss tangent (tan $\delta$) of less than 1.0%, an insulation resistance (IR) of $1 \times 10^{11} \Omega$ or above, and a temperature coefficient of capacitance (TCC) of ±15% at −55 to 125° C.

A specific embodiment of a method for fabricating the dielectric ceramic composition of the present invention can be described as follows with reference to FIG. 1.

As shown in FIG. 1, a method for fabricating an experimental example using the dielectric ceramic composition of the present invention includes a first step of preparing the dielectric ceramic composition of the present invention. FIG. 1 is a flow chart showing a method for fabricating an experimental example using the dielectric ceramic composition of the present invention.

In the preparation of the dielectric ceramic composition of the present invention, a main composition was prepared in step S110, and a composite oxide for low-temperature sintering was prepared in step S120.

In the step S110 of preparing a main composition, $BaTiO_3$ and an additive such as $Nb_2O_5$ and $Co_3O_4$ were weighed, in such a way that the weight percentage composition of $BaTiO_3$ was 99 wt. % and the additive of $Nb_2O_5$ and $Co_3O_4$ was 1 wt. %; the weight percentage composition of $BaTiO_3$ was 98.0 wt. % and the additive of $Nb_2O_5$ and $Co_3O_4$ was 2.0 wt. %; or the weight percentage composition of $BaTiO_3$ was 98 wt. % and the additive of $Nb_2O_5$ and $Co_3O_4$ was 2 wt. %. After weighing $BaTiO_3$ and the additive of $Nb_2O_5$ and $Co_3O_4$, $BaTiO_3$ was mixed with $Nb_2O_5$ and $Co_3O_4$ using a ball mill, and the whole mixture was dried out at 90° C. After completion of drying, $BaTiO_3$ and the additive of $Nb_2O_5$ and $Co_3O_4$ were subjected to a heat treatment for synthesis at 1000 to 1200° C. for 2 to 3 hours to form a core-shell structure comprised of the $BaTiO_3$ as a core and the $Nb_2O_5$ and $Co_3O_4$ covering the surface of $BaTiO_3$. In other words, when 96.0 to 99.0 wt. % of $BaTiO_3$ was mixed with 1.0 to 4.0 wt. % of the additive, the mixing ratio of $Nb_2O_5$ to $Co_3O_4$ in the additive was set to 3:1 so that the weight percentage composition of $Nb_2$% was 0.75 to 3.0 wt. % and $Co_3O_4$ was 0.25 to 1.0 wt. %. In this manner, by determining the mixing ratio of $Nb_2O_5$ to $Co_3O_4$ in the additive with respect to 96.0 to 99.0 wt. % of $BaTiO_3$, 96.0 to 99.0 wt. % of $BaTiO_3$ was mixed with 1.0 to 4.0 wt. % of $Nb_2O_5$ and $Co_3O_4$ as the additive, and the whole mixture was then subjected to a heat treatment for synthesis at 1000 to 1200° C. for 2 to 3 hours to stably form a core-shell structure comprised of the $BaTiO_3$ as a core and the $Nb_2O_5$ and $Co_3O_4$ covering the surface of $BaTiO_3$, that is, a $BaTiO_3$—$Nb_2O_5$—$Co_3O_4$ system. In the above-described process, the $BaTiO_3$-$Nb_2OA$-$Co_3O_4$ system was prepared as the main composition having a core-shell structure.

In the step S120 of preparing a composite oxide for low-temperature sintering, either $BaV_2O_6$ or $Ba_3V_4O_{13}$ was prepared in the case of selecting one from $BaV_2O_6$, $Ba_3V_4O_{13}$ and $Ba_4V_2O_9$ as the composite oxide for low-temperature sintering.

When using $BaV_2O_6$ out of the $BaV_2O_6$, $Ba_3V_4O_{13}$ and $Ba_4V_2O_9$ as the composite oxide for low-temperature sintering, for example, $BaV_2O_6$ was prepared by mixing BaO and $V_2O_5$ at a molar ratio of 1:1, reducing the mixture by ball milling and drying out at 70° C., followed by calcination at 500° C. for 2 hours. When using $Ba_3V_4O_{13}$ out of the $BaV_2O_6$, $Ba_3V_4O_{13}$ and $Ba_4V_2O_9$ as the composite oxide for low-temperature sintering, for example, $Ba_3V_4O_{13}$ was prepared by mixing BaO and $V_2O_5$ at a molar ratio of 3:2 and performing the procedures in the same manner of preparing $BaV_2O_6$.

In the case of selecting two of the $BaV_2O_6$, $Ba_3V_4O_{13}$ and $Ba_4V_2O_9$ as the composite oxide for low-temperature sintering, for example, $BaV_2O_6$ and $Ba_3V_4O_{13}$ were used. For this, $BaV_2O_6$ and $Ba_3V_4O_{13}$ were separately prepared in the same manner as described above. Here, each of the $BaV_2O_6$, $Ba_3V_4O_{13}$ and $Ba_4V_2O_9$ is $BaO—V_2O_5$, a composite oxide for low-temperature sintering. The $BaO—V_2O_5$ is used as a composite oxide for low-temperature sintering that is excellent in high-frequency dielectric characteristics and capable of being sintered at low temperatures. When using $BaV_2O_6$ and $Ba_3V_4O_{13}$ as the composite oxide for low-temperature sintering, for example, $BaV_2O_6$ and $Ba_3V_4O_{13}$ were independently prepared by the above-described method using the mixture of BaO and $V_2O_5$.

In the case of using all the three of $BaV_2O_6$, $Ba_3V_4O_{13}$ and $Ba_4V_2O_9$, $BaV_2O_6$ as the composite oxide for low-temperature sintering, for example, $BaV_2O_6$ and $Ba_3V_4O_{13}$ were independently prepared by the above-described method using the mixture of BaO and $V_2O_5$, and $Ba_4V_2O_9$ was prepared by mixing BaO and $V_2O_5$ at a molar ratio of 4:1, reducing the mixture by ball milling and drying out at 70° C., followed by calcination at 500° C. for 2 hours.

After the main composition and the composite oxide for low-temperature sintering were prepared, they were mixed together, in step S130. In the step S130 of mixing the main composition and the composite oxide for low-temperature sintering, where one of the $BaV_2O_6$, $Ba_3V_4O_{13}$ and $Ba_4V_2O_9$ was selected as the composite oxide for low-temperature sintering, either $BaV_2O_6$ or $Ba_3V_4O_{13}$ was used in an amount of 1 to 3.0 wt. % with respect to 100 wt. % of the main composition. When two of the $BaV_2O_6$, $Ba_3V_4O_{13}$ and $Ba_4V_2O_9$ were selected as the composite oxide for low-temperature sintering, $BaV_2O_6$ and $Ba_3V_4O_{13}$ were used, where $BaV_2O_6$ was mixed in an amount of 0.5 to 1.0 wt. % with respect to 100 wt. % of the main composition, and $Ba_3V_4O_{13}$ was mixed in an amount of 0.5 to 2.0 wt. % with respect to 100 wt. % of the main composition. When all the three of $BaV_2O_6$, $Ba_3V_4O_{13}$ and $Ba_4V_2O_9$ were selected as the composite oxide for low-temperature sintering, $BaV_2O_6$ was mixed in an amount of 0.5 to 2.0 wt. % with respect to 100 wt. % of the main composition, $Ba_3V_4O_{13}$ was mixed in an amount of 0.5 to 2.0 wt. % with respect to 100 wt. % of the main composition, and $Ba_4V_2O_9$ was mixed in an amount of 0.3 to 0.7 wt. % with respect to 100 wt. % of the main composition.

After the main composition and the composite oxide for low-temperature sintering were completely mixed, the mixture was reduced through ball milling, in step S140, and dried out at 95° C., in step S150. After completion of the drying process, the mixture was molded into a dielectric sheet (not shown), in step S160, and the dielectric sheet was sintered at 1180° C., in step S170. After complet ion of the sintering process, an internal electrode (not shown) was formed on the top surface of the dielectric sheet, in step S180. The internal electrode used one of the PME (precious metal electrode) materials that were precious metals, such as silver (Ag), palladium (Pd), Ag—Pd, and platinum (Pt).

A variety of experimental examples of the main composition were prepared, as given in Table 1, in order to evaluate the electrical properties of the aforementioned dielectric ceramic composition of the present invention.

TABLE 1

| Experimental Example | Main composition | | Additive | | |
|---|---|---|---|---|---|
| | $BaTiO_3$ (wt. %) | Additive (wt. %) | $Nb_2O_5$ (wt. %) | $Co_3O_4$ (wt. %) | Mixing ratio |
| 1 | 100 | 0 | 0 | 0 | 0 |
| 2 | 99.0 | 1.0 | 0.75 | 0.25 | 3.0:1.0 |
| 3 | 98.5 | 1.5 | 1.0 | 0.5 | 2.0:1.0 |
| 4 | 98.0 | 2.0 | 1.5 | 0.5 | 3.0:1.0 |
| 5 | 98.0 | 2.0 | 1.25 | 0.75 | 1.67:1.0 |
| 6 | 98.0 | 2.0 | 2.0 | 0.0 | 2.0:0 |
| 7 | 98.0 | 2.0 | 0.0 | 2.0 | 0:2.0 |
| 8 | 97.5 | 2.5 | 1.75 | 0.75 | 2.33:1.0 |
| 9 | 97.2 | 2.8 | 2.0 | 0.8 | 2.5:1.0 |
| 10 | 97.0 | 3.0 | 2.25 | 0.75 | 3.0:1.0 |
| 11 | 97.0 | 3.0 | 2.0 | 1.0 | 2.0:1.0 |
| 12 | 96.5 | 3.5 | 2.5 | 1.0 | 2.5:1.0 |
| 13 | 96.0 | 4.0 | 3.0 | 1.0 | 3.0:1.0 |
| 14 | 96.0 | 4.0 | 2.75 | 1.25 | 2.2:1.0 |
| 15 | 95.5 | 4.5 | 3.25 | 1.25 | 2.6:1.0 |

Table 1 relates to the preparation of the main composition. The main composition of Experimental Example 1 as presented in Table 1 was prepared using 100 wt. % of $BaTiO_3$ without any additive. The main composition of Experimental Example 2 was prepared by mixing 99.0 wt. % of $BaTiO_3$ and 1.0 wt. % of an additive, which was comprised of 0.75 wt. % of $Nb_2O_5$ and 0.25 wt. % of $Co_3O_4$ so that the mixing ratio of $Nb_2O_5$ to $Co_3O_4$ was 3.0:1.0. The main composition of Experimental Example 3 was prepared by mixing 98.5 wt. % of $BaTiO_3$ and 1.5 wt. % of an additive, which was comprised of 1.0 wt. % of $Nb_2O_5$ and 0.5 wt. % of $Co_3O_4$ so that the mixing ratio of $Nb_2O_5$ to $Co_3O_4$ was 2.0:1.0. The main composition of Experimental Example 4 was prepared by mixing 98.0 wt. % of $BaTiO_3$ and 2.0 wt. % of an additive, which was comprised of 1.5 wt. % of $Nb_2O_5$ and 0.5 wt. % of $Co_3O_4$ so that the mixing ratio of $Nb_2O_5$ to $Co_3O_4$ was 3.0:1.0. Each of the Experiment al Examples 5 to 15 was prepared in the same manner as described in Experimental Example 4 using the mixing ratio given in Table 1.

After $BaTiO_3$, $Nb_2O_5$ and $Co_3O_4$ were mixed as presented in Table 1 in the Experimental Examples 1 to 15, a heat treatment for synthesis was performed at 1000° C. for 2 hours to form a core-shell structure comprised of the $BaTiO_3$ as a core and the $Nb_2O_5$ and $Co_3O_4$ covering the surface of $BaTiO_3$, in the Experimental Examples 1 to 9, 13, 14, and 15. Also, a heat treatment for synthesis was performed at 1,200° C. for 3 hours to form a core-shell structure comprised of the $BaTiO_3$ as a core and the $Nb_2O_5$ and $Co_3O_4$ covering the surface of $BaTiO_3$, in the Experimental Examples 10, 11 and 12.

The Experimental Examples 1 to 15 presented in Table 1 related to the dielectric ceramic compositions of the present invention, each of which was used to fabricate a 2010-sized multi-layer ceramic capacitor (not shown). The multi-layer ceramic capacitors were fabricated through a known method, excepting that sintering was conducted at 1180° C. as presented in Table 2. The 2010-sized multi-layer ceramic capacitors prepared using the dielectric ceramic compositions of Experimental Examples 1 to 15 were tested in regards to permittivity (ε), loss tangent (tan δ), insulation resistance (IR), and temperature coefficient of capacitance (TCC). The testing methods use known techniques and are not described in this disclosure. In the TCC testing, the TCC was measured at −55° C., 85° C. and 125° C. in order to determine whether the ceramic capacitors satisfied the X7R standards of EIA. The testing results are presented in Table 2.

TABLE 2

| Experimental Example | Sintering temperature (1180° C.) | | | TCC (%) | | |
|---|---|---|---|---|---|---|
| | Permittivity (ε) | tan δ (%) | IR (Ω) | −55° C. | 85° C. | 125° C. |
| 1 | 2714 | 1.16 | 8.19E+10 | −34.7 | −9.9 | 278.8 |
| 2 | 3004 | 0.95 | 5.21E+10 | −35.6 | 20.5 | 2.5 |
| 3 | 2434 | 2.73 | 2.25E+09 | −43.3 | 6.4 | 9 |
| 4 | 3420 | 1.15 | 9.61E+10 | −24.3 | −18 | −23.1 |
| 5 | 2477 | 1.57 | 8.88E+08 | −43.1 | −6.5 | −10.4 |
| 6 | 3552 | 1.02 | 1.10E+11 | −33.2 | −16.6 | −28.7 |
| 7 | 2108 | 5.1 | 1.07E+09 | −42.5 | 28.1 | 63.2 |
| 8 | 4207 | 0.76 | 4.58E+09 | −57.8 | −41.8 | −57.2 |
| 9 | 16899 | 43.51 | 0.00E+00 | −33.2 | −64.8 | −73.2 |
| 10 | 2518 | 0.59 | 1.11E+12 | 11.4 | −17.8 | −21.8 |
| 11 | 3549 | 1.47 | 1.51E+09 | −35.5 | −39.8 | −48.2 |
| 12 | 2416 | 0.49 | 1.39E+12 | 23.3 | −21.2 | −27.4 |
| 13 | 2835 | 0.45 | 1.22E+12 | 41.9 | −17.2 | −22.6 |
| 14 | 3520 | 0.43 | 1.04E+09 | 70.1 | −57.4 | −68.9 |
| 15 | 1613 | 0.39 | 1.19E+12 | 46.4 | −17.9 | −23.5 |

As shown in Table 2, the Experimental Example 1 exhibited a permittivity (ε) of 2714, a loss tangent (tan δ) of 1.16%, an insulation resistance (IR) of 8.19E±10Ω, and a temperature coefficient of capacitance (TCC) of −34.7% at −55° C., 9.97% at 85° C. and 278.8% at 125° C. The TCC of the Experimental Example 1 had a change up to 278.8% at 125° C., with a larger variation rate than the TCC (125° C.) of the Experimental Example 4. Therefore, it was determined that the main composition of the Experimental Example 1 was not suitable as a material for preparing the dielectric ceramic composition of the present invention.

The Experimental Example 2 showed a permittivity (ε) of 3004, a loss tangent (tan δ) of 0.95%, an insulation resistance (IR) of 5.21E±10Ω, and a temperature coefficient of capacitance (TCC) of −35% at −55° C., 20.5% at 85° C. and 2.5% at 125° C. The TCC of the Experimental Example 2 was similar to that of the Experimental Example 4, so it was determined that the main composition of the Experimental Example 2 was suitable as a material for preparing the dielectric ceramic composition of the present invention.

The Experimental Example 3 had a permittivity (ε) of 2434, a loss tangent (tan δ) of 2.73%, an insulation resistance (IR) of 2.25E±09Ω, and a temperature coefficient of capacitance (TCC) of −43.3% at −55° C., 6.4% at 85° C. and 9.0% at 125° C. As the Experimental Example 3 had a high loss tangent (tan δ) and a low IR value in relation to the Experimental Example 4, it was determined that the main composition of the Experimental Example 3 was not suitable as a material for preparing the dielectric ceramic composition of the present invention.

The experimental Example 4 was entirely excellent in regards to permittivity (ε), loss tangent (tan δ), insulation resistance (IR), and temperature coefficient of capacitance (TCC), as presented in Table 2. Therefore, it was determined that the main composition of the Experimental Example 4 was suitable as a material for preparing the dielectric ceramic composition of the present invention. The measurement results of the Experimental Example 4 were used as a reference to determine whether a main composition was available in the preparation of the dielectric ceramic composition of the present invention.

The Experimental Example 5 had a higher loss tangent (tan δ) and a lower IR value than the Experimental Example 4. Therefore, it was determined that the main composition of the Experimental Example 5 was not suitable as a material for preparing the dielectric ceramic composition of the present invention. The Experimental Example 6 had a high permittivity (ε) and a large variation rate of TCC at 125° C. relative to the Experimental Example 4. It was therefore determined that the main composition of the Experimental Example 6 was not suitable as a material for preparing the dielectric ceramic composition of the present invention. The Experimental Example 7 had a higher loss tangent (tan δ), a lower IR value, and a larger variation rate of TCC at 125° C. than the Experimental Example 4. It was therefore determined that the main composition of the Experimental Example 7 was not suitable as a material for preparing the dielectric ceramic composition of the present invention.

The Experimental Example 8 had a low IR value and a large variation rate of TCC at 125° C. in relation to the Experimental Example 4, so it was determined that the main composition of the Experimental Example 8 was not suitable as a material for preparing the dielectric ceramic composition of the present invention. The Experimental Example 9 had a high permittivity (ε), a high loss tangent (tan δ), an error in IR characteristics, and a great variation rate of TCC at 125° C. in relation to the Experimental Example 4. It was therefore determined that the main composition of the Experimental Example 9 was not suitable as a material for preparing the dielectric ceramic composition of the present invention.

The measurement results of the Experimental Examples 10 and 13 were entirely close to the measurements of the Experimental Example 4, so it was determined that the main compositions of the Experimental Examples 10 and 13 were suitable for use in the preparation of the dielectric ceramic composition of the present invention.

The Experimental Example 11 had a higher permittivity (ε), a lower IR characteristic and a larger variation rate of TCC at 125° C. than the Experimental Example 4. The Experimental Example 12 had a larger variation rate of TCC at 125° C. than the Experimental Example 4. The Experimental Example 14 had a higher permittivity (ε), a lower IR characteristic and a larger variation rate of TCC at 125° C. than the Experimental Example 4. In other words, it was determined that the main compositions of the Experimental Examples 11, 12, 14 and 15 were not suitable as materials for use in the preparation of the dielectric ceramic composition of the present invention for the above-described reasons.

The main compositions of the Experimental Examples 1 to 15 were evaluated with reference to that of the Experimental Example 4 to determine whether they were suitable as a material for use in preparation of the dielectric ceramic composition of the present invention. As for a basis for determination, the main composition was considered as being unsuitable as a material for the dielectric ceramic composition of the present invention when the measurement results deviate too much from the measurements of the Experimental Example 4.

Out of the main compositions of the Experimental Examples 1 to 15, those of the Experimental Examples 2, 4, 10, and 13 were considered suitable as a material for used in the preparation of the dielectric ceramic composition of the present invention. The main compositions of the Experimental Examples 2, 4, 10, and 13 were considered acceptable, because they were formed by mixing 96.0 to 99.0 wt. % of $BaTiO_3$ and 1.0 to 4.0 wt. % of an additive, which was comprised of 0.75 to 3.0 wt. % of $Nb_2O_5$ and 0.25 to 1.0 wt. % of $Co_3O_4$ to have a mixing ratio ($Nb_2O_5$:$Co_3O_4$) of 3:1, and then performing a heat treatment for synthesis at 1000 to 1200° C. for 2 to 3 hours to stably form a core-shell structure consisting of the $BaTiO_3$ as a core and the $Nb_2O_5$ and $Co_3O_4$ covering the surface of $BaTiO_3$.

The dielectric ceramic compositions of the present invention were evaluated in regards to permittivity (ε), loss tangent (tan δ), IR, and X7R requirements. The accepted main compositions, that is, the main compositions of the Experimental Examples 2, 4, 10, and 12 were used to fabricate Examples 1 to 25 as given in Tables 3 and 4.

TABLE 3

| | Dielectric ceramic composition | | | Mixing ratio of composite oxide for low temperature sintering | | |
|---|---|---|---|---|---|---|
| Example | Main composition (part by weight) | $BaV_2O_6$ (part by weight) | $Ba_3V_4O_{13}$ (part by weight) | $Ba_4V_2O_9$ (part by weight) | X(BaO) (mol) | Y($V_2O_5$) (mol) | Molar ratio |
| 1 | 100 | 1 | 0 | 0 | 1 | 1 | 1:1 |
| 2 | 100 | 3 | 0 | 0 | 1 | 1 | 1:1 |
| 3 | 100 | 5 | 0 | 0 | 1 | 1 | 1:1 |
| 4 | 100 | 0 | 1 | 0 | 3 | 2 | 3:2 |
| 4 | 100 | 0 | 3 | 0 | 3 | 2 | 3:2 |
| 6 | 100 | 0 | 5 | 0 | 3 | 2 | 3:2 |
| 7 | 100 | 0 | 0 | 1 | 4 | 1 | 4:1 |
| 8 | 100 | 0 | 0 | 3 | 4 | 1 | 4:1 |
| 9 | 100 | 0 | 0 | 5 | 4 | 1 | 4:1 |

Each of the dielectric ceramic compositions of the present invention according to the Examples 1 to 9 as presented in Table 3 was formed by mixing the corresponding main composition and one of the $BaV_2O_6$, $Ba_3V_4O_{13}$ and $Ba_4V_2O_9$ as a composite oxide for low-temperature sintering.

The dielectric ceramic composition of the present invention according to the Example 1 as presented in Table 3 was prepared by mixing 1 part by weight of $BaV_2O_6$ with respect to 100 parts by weight of the main composition, where the $BaV_2O_6$ of the Example 1 was formed by mixing BaO and $V_2O_5$ at a molar ratio of 1:1, that is, 1 mole of BaO and 1 mole of $V_2O_5$. The dielectric ceramic composition of the Example 2 was prepared by mixing 3 parts by weight of $BaV_2O_6$ with respect to 100 parts by weight of the main composition, where the $BaV_2O_6$ was formed by mixing BaO and $V_2O_5$ at the same molar ratio of the Example 1. The dielectric ceramic composition of the Example 3 was prepared by mixing 5 parts by weight of $BaV_2O_6$ with respect to 100 parts by weight of the main composition, where the $BaV_2O_6$ was formed by mixing BaO and $V_2O_5$ at the same molar ratio of the Example 1.

The dielectric ceramic composition of the Example 4 was prepared by mixing 1 part by weight of $Ba_3V_4O_{13}$ with respect to 100 parts by weight of the main composition, where the $Ba_3V_4O_{13}$ was formed by mixing BaO and $V_2O_5$ at a molar ratio of 3:2, that is, 3 moles of BaO and 2 moles of $V_2O_5$. The dielectric ceramic composition of the Example 5 was prepared by mixing 3 parts by weight of $Ba_3V_4O_{13}$ with respect to 100 parts by weight of the main composition, where the $Ba_3V_4O_{13}$ was formed by mixing BaO and $V_2O_5$ at the same molar ratio of the Example 4. The dielectric ceramic composition of the Example 6 was prepared by mixing 5 parts by weight of $Ba_3V_4O_{13}$ with respect to 100 parts by weight of the main composition, where the $Ba_3V_4O_{13}$ was formed by mixing BaO and $V_2O_5$ at the same molar ratio of the Example 4.

The dielectric ceramic composition of the Example 7 was prepared by mixing 1 part by weight of $Ba_4V_4O_{13}$ with respect to 100 parts by weight of the main composition, where the $Ba_4V_4O_{13}$ was formed by mixing BaO and $V_2O_5$ at a molar ratio of 4:1, that is, 4 moles of $Ba_0$ and 1 mole of $V_2O_5$. The dielectric ceramic composition of the Example 8 was prepared by mixing 3 parts by weight of $Ba_4V_2O_9$ with respect to 100 parts by weight of the main composition, where the $Ba_4V_2O_9$ was formed by mixing BaO and $V_2O_5$ at the same molar ratio of the Example 7. The dielectric ceramic composition of the Example 9 was prepared by mixing 5 parts by weight of $Ba_4V_2O_9$ with respect to 100 parts by weight of the main composition, where the $Ba_4V_2O_9$ was formed by mixing BaO and $V_2O_5$ at the same molar ratio of the Example 7.

TABLE 4

| | Dielectric ceramic composition | | | | |
|---|---|---|---|---|---|
| Example | Main composition (part by weight) | A:$BaV_2O_6$ (part by weight) | B:$Ba_3V_4O_{13}$ (part by weight) | B:$Ba_4V_2O_9$ (part by weight) | A + B + C (part by weight) |
| 10 | 100 | 0.5 | 0.5 | 0 | 1 |
| 11 | 100 | 1 | 1 | 0 | 2 |
| 12 | 100 | 1 | 2 | 0 | 3 |
| 13 | 100 | 2 | 1 | 0 | 3 |
| 14 | 100 | 0.5 | 0 | 0.5 | 1 |
| 15 | 100 | 1 | 0 | 0.5 | 1.5 |
| 16 | 100 | 0.5 | 0 | 1 | 1.5 |
| 17 | 100 | 0 | 0.5 | 0.5 | 1 |
| 18 | 100 | 0 | 1 | 1 | 2 |
| 19 | 100 | 0 | 1.5 | 0.5 | 2 |
| 20 | 100 | 0 | 0.5 | 1.5 | 2 |
| 21 | 100 | 0.5 | 0.5 | 0.5 | 1.5 |
| 22 | 100 | 1 | 0.5 | 0.5 | 2 |
| 23 | 100 | 2 | 0.5 | 0.5 | 3 |
| 24 | 100 | 0.5 | 1 | 1 | 2.5 |
| 25 | 100 | 0.5 | 2 | 0.5 | 3 |

As presented in Table 4, the dielectric ceramic compositions of the present invention according to the Examples 10 to 20 were formed by mixing the corresponding main composition and two of the $BaV_2O_6$, $Ba_3V_4O_{13}$ and $Ba_4V_2O_9$ as a composite oxide for low-temperature sintering, and the dielectric ceramic compositions of the present invention according to the Examples 21 to 25 were formed by mixing the corresponding main composition and three of the $BaV_2O_6$, $Ba_3V_4O_{13}$ and $Ba_4V_2O_9$ as a composite oxide for low-temperature sintering. In Table 4, A is $BaV_2O_6$, B is $Ba_3V_4O_{13}$, and C is $Ba_4V_2O_9$.

Among the dielectric ceramic compositions of the present invention according to the Examples 10 to 25 as presented in Table 4, the dielectric ceramic compositions of the Example 10 were formed by mixing the main composition and two of the three composite oxides for low-temperature sintering. In other words, the dielectric ceramic composition of the Example 10 was formed by mixing 1 part by weight of the composite oxide for low-temperature sintering (A+B+C in Table 4) with respect to 100 parts by weight of the main composition, where the composite oxide for low-temperature sintering included $BaV_2O_6$ and $Ba_3V_4O_{13}$ out of the $BaV_2\%$, $Ba_3V_4O_{13}$ and $Ba_4V_2O_9$. The $BaV_2\%$ was used in an amount of 0.5 part by weight with respect to 100 parts by weight of the main composition, and the $Ba_3V_4O_{13}$ was used in an amount of 0.5 part by weight with respect to 100 parts by weight of the main composition. The dielectric ceramic composition of the Example 11 was formed by mixing 2 parts by weight of the composite oxide for low-temperature sintering (A+B+C in Table 4) with respect to 100 parts by weight of the main composition, where the $BaV_2\%$ was used in an amount of 1 part by weight with respect to 100 parts by weight of the main compos it ion, and the $Ba_3V_4O_{13}$ was used in an amount of 1 part by weight with respect to 100 parts by weight of the main composition. The dielectric ceramic compositions of the Examples 12 and 13 were, as presented in Table 4, formed by mixing the corresponding main composition with $BaV_2\%$ and $Ba_3V_4O_{13}$, where the mixing ratios were as given in Table 4.

The dielectric ceramic composition of the Example 14 was formed by mixing 1 part by weight of the composite oxide for low-temperature sintering (A+B+C in Table 4) with respect to 100 parts by weight of the main composition, where the composite oxide for low-temperature sintering included $BaV_2O_6$ and $Ba_4V_2O_9$ out of the $BaV_2O_6$, $Ba_3V_4O_{13}$ and $Ba_4V_2O_9$, and the mixing ratio of $BaV_2O_6$ to $Ba_4V_2O_9$ was as given in Table 4. In the same manner of the Example 14, the Examples 15 and 16 used $BaV_2O_6$ and $Ba_4V_2O_9$ as the composite oxide for low-temperature sintering in addition to the corresponding main composition, where the mixing ratios of the main composition, $BaV_2O_6$ and $Ba_4V_2O_9$ were as given in Table 4.

The dielectric ceramic composition of the Example 18 was formed by mixing 2 parts by weight of the composite oxide for low-temperature sintering (A+B+C in Table 4) with respect to 100 parts by weight of the main composition, where the composite oxide for low-temperature sintering included $Ba_3V_4O_{13}$ and $Ba_4V_2O_9$ out of the $BaV_2O_9$, $Ba_3V_4O_{13}$ and $Ba_4V_2O_9$, and the mixing ratio of $Ba_3V_4O_{13}$ to $Ba_4V_2O_9$ was as given in Table 4. In the same manner of the Example 18, the Examples 19 and 20 used $Ba_3V_4O_{13}$ and $Ba_4V_2O_9$ as the composite oxide for low-temperature sintering in addition to the corresponding main composition, where the mixing ratios of the main composition, $Ba_3V_4O_{13}$ and $Ba_4V_2O_9$ were as given in Table 4.

The dielectric ceramic compositions of the present invention according to the Examples 21 to 25 as presented in Table 4 were formed by mixing the corresponding main composition and all the three composite oxides for low-temperature sintering.

The dielectric ceramic composition of the Example 21 was formed by mixing 1.5 part by weight of the composite oxide for low-temperature sintering (A+B+C in Table 4) with respect to 100 parts by weight of the main composition, where the composite oxide for low-temperature sintering included $BaV_2O_6$, $Ba_3V_4O_{13}$ and $Ba_4V_2O_9$. The mixing ratio of $BaV_2O_6$, $Ba_3V_4O_{13}$ and $Ba_4V_2O_9$ was as presented in Table 4. As in the Example 21, the Examples 22 and 25 used $BaV_2O_6$, $Ba_3V_4O_{13}$ and $Ba_4V_2O_9$ as the composite oxide for low-temperature sintering in addition to the main composition.

The Examples 1 to 25 presented in Tables 3 and 4 are directed to the main compositions for the preparation of the dielectric ceramic compositions of the present invention. Each of the main compositions of the Examples 1 to 25 was used to fabricate a 2010-sized multi-layer ceramic capacitor (not shown). The fabrication method for the multi-layer ceramic capacitor was a known method, excepting that the sintering process was performed at 1180° C. as presented in Table 2. The 2010-sized multi-layer ceramic capacitors prepared using the dielectric ceramic compositions of the Examples 1 to 15 were evaluated by testing in regards to permittivity ($\varepsilon$), loss tangent (tan $\delta$), insulation resistance (IR), and a temperature coefficient of capacitance (TCC). The testing methods, using known techniques, are not described in this disclosure. The TCC testing was measuring the TCC values at −55° C., 85° C. and 125° C. in order to determine whether the multi-layer ceramic capacitor satisfied the X7R standards of EIA.

TABLE 5

| | Sintering temperature (1180° C.) | | | | | |
|---|---|---|---|---|---|---|
| | Permittivity | tan δ | IR | TCC (%) | | |
| Example | (ε) | (%) | (Ω) | −55° C. | 85° C. | 125° C. |
| 1 | 2199 | 0.84 | 1.31E+12 | −7.6 | −9.9 | −10.7 |
| 2 | 1592 | 0.95 | 1.23E+12 | −3.2 | −2.9 | −0.2 |
| 3 | 1279 | 0.75 | 1.07E+12 | −5.6 | −1.9 | 0.7 |
| 4 | 2062 | 0.87 | 1.13E+12 | −8.3 | −10.6 | −12.0 |
| 4 | 2143 | 0.80 | 8.13E+11 | −9.0 | −11.0 | −12.9 |
| 6 | 1486 | 0.74 | 6.45E+11 | −0.9 | −5.9 | −5.3 |
| 7 | 2378 | 1.34 | 4.52E+10 | −9.7 | −14.6 | −17.1 |
| 8 | 2123 | 8.2 | 3.32E+08 | −16.6 | −18.3 | −22.4 |
| 9 | 1856 | 16.93 | 1.01E+08 | −20.9 | −21.8 | −28.1 |

As shown in Table 5, the Example 1 exhibited a permittivity ($\varepsilon$) of 2,199, a loss tangent (tan $\delta$) of 0.84%, an insulation resistance (IR) of 1.31E±12Ω, and a temperature coefficient of capacitance (TCC) of −7.6% at −55° C., −2.9% at 85° C. and −10.7% at 125° C. The testing results of the Example 1 presented in Table 5 indicated that the Example 1 satisfied the requirements for the dielectric ceramic composition of the present invention, i.e., to have a permittivity ($\varepsilon$) of 2000 to 2500, a loss tangent (tan $\delta$) of less than 1.0%, an insulation resistance (IR) of $1 \times 10^{11}$Ω or above, and a temperature coefficient of capacitance (TCC) of ±15% at −55 to 125° C.

The Example 2 had a low permittivity ($\varepsilon$) of 1592, and the Example 3 also had a low permittivity ($\varepsilon$) of 1279, not satisfying the requirement for the dielectric ceramic composition of the present invention to have a permittivity ($\varepsilon$) of 2000 to 2500.

The Example 4 had a permittivity ($\varepsilon$) of 2062, a loss tangent (tan $\delta$) of 0.95%, an insulation resistance CIR) of 1.13E±12Ω, and a temperature coefficient of capacitance (TCC) of −8.3% at −55° C., −10.6% at 85° C. and −12.0% at 125° C., so it satisfied the aforementioned requirements for the dielectric ceramic composition of the present invention.

The Example 5 had a permittivity (ε) of 2143, a loss tangent (tan δ) of 0.80%, an insulation resistance CIR) of 8.13E±11Ω, and a temperature coefficient of capacitance (TCC) of −9.0% at −55° C., −11.0% at 85° C. and −12.9% at 125° C., satisfying the aforementioned requirements for the dielectric ceramic composition of the present invention.

The Example 6 had a low permittivity (ε) of 1486, and the Example 7 had a high loss tangent (tan δ) of 1.34% and a large variation of TCC to −17.1% at 125° C. The Example 8 had a high loss tangent (tan δ) of 8.2%, a low IR of 3.32E±08Ω, and entirely a large variation of TCC. The Example 9 had a low permittivity (ε) of 1856, a high loss tangent (tan δ) of 16.93%, a low IR of 1.01E±08Ω, and entirely a large variation of TCC. That is, none of the Examples 6 to 9 satisfied the requirement for the dielectric ceramic composition of the present invention to have a permittivity (ε) of 2000 to 2500.

A requirement for the dielectric ceramic composition of the present invention comprised of a main composition and one of the $BaV_2O_6$, $Ba_3V_4O_{13}$ and $Ba_4V_2O_9$ as a composite oxide for low-temperature sintering is that either $BaV_2O_6$ or $Ba_3V_4O_{13}$ is used as the composite oxide for low-temperature sintering, where the $BaV_2$% is formed by mixing BaO and $V_2O_5$ at a molar ratio of 1:1, and the $Ba_3V_4O_{13}$ is formed by mixing BaO and $V_2O_5$ at a molar ratio of 3:2, as in the Examples 1, 4 and 5 given in Table 3.

TABLE 6

| | Sintering temperature (1180° C) | | | | | |
|---|---|---|---|---|---|---|
| | Permittivity | tan δ | IR | TCC (%) | | |
| Example | (ε) | (%) | (Ω) | −55° C. | 85° C. | 125° C. |
| 10 | 2352 | 0.81 | 2.08E+12 | −9 | −12.5 | −13.9 |
| 11 | 2130 | 0.84 | 1.22E+12 | −8 | −10.3 | −11.4 |
| 12 | 2171 | 0.82 | 1.06E+12 | −8.3 | −10.5 | −11.8 |
| 13 | 1827 | 0.91 | 1.2E+12 | −6.85 | −8.5 | −9.3 |
| 14 | 2289 | 1.09 | 6.77E+11 | −8.65 | −12.3 | −13.9 |
| 15 | 2217 | 1.21 | 6.81E+11 | −8.42 | −11.8 | −13.4 |
| 16 | 2301 | 1.54 | 2.32E+11 | −10.23 | −13.9 | −16.5 |
| 17 | 2466 | 1.21 | 6.52E+11 | −8.18 | −11.45 | −13.18 |
| 18 | 2220 | 1.11 | 5.86E+11 | −9 | −12.6 | −14.55 |
| 19 | 2260 | 1.07 | 4.29E+11 | −9.35 | −13.01 | −15.06 |
| 20 | 2092 | 4.53 | 5.65E+10 | −13.45 | −15.45 | −18.2 |
| 21 | 2313 | 0.88 | 8.28E+11 | −8.2 | −11.7 | −13.26 |
| 22 | 2254 | 0.98 | 9.92E+11 | −7.8 | −10.7 | −12.17 |
| 23 | 2110 | 0.99 | 8.14E+11 | −7.4 | −10.53 | −12.5 |
| 24 | 2213 | 0.97 | 8.55E+11 | −8.53 | −12.01 | −14.26 |
| 25 | 2240 | 0.95 | 8.42E+11 | −8.76 | −11.93 | −13.33 |

As shown in Table 6, the Example 10 exhibited a permittivity (ε) of 2352, a loss tangent (tan δ) of 0.81%, an insulation resistance (IR) of 2.081E±12Ω, and a temperature coefficient of capacitance (TCC) of −9% at −55° C., −12.5% at 85° C. and −13.9% at 125° C. The testing results of the Example 10 presented in Table 6 indicated that the Example 10 satisfied the requirements for the dielectric ceramic composition of the present invention, i.e., to have a permittivity (ε) of 2000 to 2500, a loss tangent (tan δ) of less than 1.0%, an insulation resistance (IR) of $1\times10^{11}\Omega$ or above, and a temperature coefficient of capacitance (TCC) of ±15% at −55 to 125° C.

The Example 11 had a permittivity (ε) of 2130, a loss tangent (tan δ) of 0.84%, an insulation resistance (IR) of 1.221E±12Ω, and a temperature coefficient of capacitance (TCC) of −8% at −55° C., −10.3% at 85° C. and −11.4% at 125° C. The Example 12 had a permittivity (ε) of 2171, a loss tangent (tan δ) of 0.82%, an insulation resistance (IR) of 1.061E±12Ω, and a temperature coefficient of capacitance (TCC) of −8.3% at −55° C., −10.5% at 85° C. and −11.8% at 125° C. Both the Examples 11 and 12 satisfied the requirements for the dielectric ceramic composition of the present invention.

The Example 13 had a low permittivity (ε) of 1827, the Example 14 had a high loss tangent (tan δ) of 1.09%, and the Examples 15 to 20 had a loss tangent (tan δ) at least as high as the Example 14 as presented in Table 6, showing that the aforementioned requirements for the dielectric ceramic composition of the present invention were not met. The Examples 21 to 25 satisfied the requirements for the dielectric ceramic composition of the present invention as shown in Table 6. Here, the Example 22 was a preferred embodiment using 0.5 part by weight of $Ba_4V_2O_9$ with respect to 100 parts by weight of the main composition, which satisfied the requirement for the dielectric ceramic composition of the present invention in that $Ba_4V_2O_9$ was used in an amount of 0.3 to 0.7 part by weight with respect to 100 parts by weight of the main composition.

As described above, it can be seen that the aforementioned requirements for the dielectric ceramic composition of the present invention were met when $BaV_2O_6$ and $Ba_3V_4O_{13}$ were used in the case of the dielectric ceramic composition using two out of the $BaV_2O_6$, $Ba_3V_4O_{13}$ and $Ba_4V_2O_9$ as the composite oxide for low-temperature sintering in addition to the main composition.

As described above, it can also be seen that the aforementioned requirements for the dielectric ceramic composition of the present invention were satisfied when $Ba_4V_2O_9$ was used in an amount of 0.5 part by weight with respect to 100 parts by weight of the main composition in the case of the dielectric ceramic composition using all the three oxides, i.e., $BaV_2O_6$, $Ba_3V_4O_{13}$ and $Ba_4V_2O_9$ as the composite oxide for low-temperature sintering in addition to the main composition.

In this manner, the dielectric ceramic composition of the present invention is prepared by mixing $BaTiO_3$ and an additive to form a main composition and adding at least one of $BaV_2O_6$, $Ba_3V_4O_{13}$ and $Ba_4V_2O_9$ as a composite oxide for low-temperature sintering to the main composition, so it can satisfy the requirements to have a permittivity (ε) of 2000 to 2500, a loss tangent (tan δ) of less than 1.0%, an insulation resistance (IR) of $1\times10^{11}\Omega$ or above, and a temperature coefficient of capacitance (TCC) of ±15% at −55 to 125° C.

In other words, the dielectric ceramic composition of the present invention is formed by using a $BaTiO_3$—$Nb_2O_5$—$Co_3O_4$ system being formed into a core-shell structure and BaO—$V_2O_5$ as a composite oxide for low-temperature sintering excellent in high-frequency dielectric properties and capable of being sintered at low temperatures, so it can meet the X7R characteristics specified in the EIA standard to provide a long lifespan and a high reliability when in use for extreme environments, such as military (standard, MIL-PRF123) or aerospace (standard, ESCC 3009) use, get sintered at various temperatures for activation and prevent dielectric loss and gelation of slurries.

What is claimed is:

1. A dielectric ceramic composition for multi-layer ceramic capacitor for use in extreme environments,
   the dielectric ceramic composition being formed by mixing a main composition and a composite oxide for low-temperature sintering,
   wherein the main composition comprises 96.0 to 99.0 wt. % of $BaTiO_3$ and 1.0 to 4.0 wt. % of $Nb_2O_5$ and $Co_3O_4$ as an additive, the main composition being formed by performing a heat treatment for synthesis to form a core-shell structure having the $BaTiO_3$ as a core and the $Nb_2O_5$ and $Co_3O_4$ covering the surface of the $BaTiO_3$,
wherein the composite oxide for low-temperature sintering is at least one selected from $BaV_2O_6$, $Ba_3V_4O_{13}$ and $Ba_4V_2O_9$.

2. The dielectric ceramic composition according to claim 1, wherein the main composition is formed by mixing 96.0 to 99.0 wt. % of $BaTiO_3$, 0.75 to 3.0 wt. % of $Nb_2O_5$ and 0.25 to 1.0 wt. % of $Co_3O_4$ and conducting a heat treatment for synthesis at 1000 to 1200° C. for 2 to 3 hours to form a core-shell structure having the $BaTiO_3$ as a core and the $Nb_2O_5$ and $Co_3O_4$ covering the surface of the $BaTiO_3$,
wherein the $Nb_2O_5$ and $Co_3O_4$ are mixed at a mixing weight (wt. %) ratio of 3:1.

3. The dielectric ceramic composition according to claim 1, wherein when the composite oxide for low-temperature sintering includes any one of $BaV_2O_6$, $Ba_3V_4O_{13}$ and $Ba_4V_2O_9$, either $BaV_2O_5$ or $Ba_3V_4O_{13}$ is used,
wherein the $BaV_2O_6$ or $Ba_3V_4O_{13}$ is used in an amount of 1 to 3.0 parts by weight with respect to 100 parts by weight of the main composition.

4. The dielectric ceramic composition according to claim 1, wherein when the composite oxide for low-temperature sintering includes two of $BaV_2O_6$, $Ba_3V_4O_{13}$ and $Ba_4V_2O_9$, $BaV_2O_6$ and $Ba_3V_4O_{13}$ are used,
wherein the $BaV_2O_6$ is used in an amount of 0.5 to 1.0 part by weight with respect to 100 parts by weight of the main composition,
wherein the $Ba_3V_4O_{13}$ is used in an amount of 0.5 to 2.0 parts by weight with respect to 100 parts by weight of the main composition.

5. The dielectric ceramic composition according to claim 1, wherein when the composite oxide for low-temperature sintering includes all the three of $BaV_2O_6$, $Ba_3V_4O_{13}$ and $Ba_4V_2O_9$, the $BaV_2O_6$ is used in an amount of 0.5 to 2.0 parts by weight with respect to 100 parts by weight of the main composition,
the $Ba_3V_4O_{13}$ being used in an amount of 0.5 to 2.0 parts by weight with respect to 100 parts by weight of the main composition,
the $Ba_4V_2O_9$ being used in an amount of 0.3 to 0.7 part by weight with respect to 100 parts by weight of the main composition.

6. The dielectric ceramic composition according to claim 1, wherein each of the $BaV_2O_6$, $Ba_3V_4O_{13}$ and $Ba_4V_2O_9$ is formed of $BaO$ and $V_2O_5$.

7. The dielectric ceramic composition according to claim 1, wherein the dielectric ceramic composition has a permittivity ($\varepsilon$) of 2000 to 2500, a loss tangent (tan $\delta$) of less than 1.0%, an insulation resistance (IR) of $1\times10^{11}\Omega$ or above, and a temperature coefficient of capacitance (TCC) of ±15% at −55 to 125° C.

* * * * *